(12) United States Patent
Oren (10) Patent No.: US 9,796,319 B1
(45) Date of Patent: *Oct. 24, 2017

(54) TRAILER ASSEMBLY FOR TRANSPORT OF CONTAINERS OF PROPPANT MATERIAL

(71) Applicant: Oren Technologies, LLC, Houston, TX (US)

(72) Inventor: Joshua Oren, Houston, TX (US)

(73) Assignee: OREN TECHNOLOGIES, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/219,359

(22) Filed: Jul. 26, 2016

Related U.S. Application Data (63) Continuation of application No. 13/854,405, filed on Apr. 1, 2013.

(51) Int. Cl.
    *B60P 3/00* (2006.01)
    *B62D 53/06* (2006.01)
    *B60D 1/48* (2006.01)

(52) U.S. Cl.
CPC ............... *B60P 3/00* (2013.01); *B62D 53/06* (2013.01); *B62D 53/061* (2013.01); *B62D 53/065* (2013.01); *B60D 1/488* (2013.01)

(58) Field of Classification Search
CPC .... B62D 53/065; B62D 53/061; B62D 53/06; B60D 1/488
See application file for complete search history.

(56) References Cited

U.S. PATENT DOCUMENTS

| 137,871 A | 4/1873 | Worsley |
| 150,894 A | 5/1874 | Safely |
| 384,443 A | 6/1888 | Hoover |
| 448,238 A | 3/1891 | Johnson |

(Continued)

FOREIGN PATENT DOCUMENTS

| CA | 2023138 | 2/1992 |
| CA | 2791088 | 3/2013 |

(Continued)

OTHER PUBLICATIONS

International Search Report for related International Application No. PCT/US2012/066639, dated Feb. 25, 2013.

(Continued)

*Primary Examiner* — Joseph Rocca
*Assistant Examiner* — Marlon A Arce
(74) *Attorney, Agent, or Firm* — Hogan Lovells US LLP (57) ABSTRACT

A trailer assembly suitable for carrying a container of proppant has a frame with a first side rail and a second side rail extending in generally parallel relation to each other and a plurality of wheels rotatably mounted below the frame. The frame has a plurality of cross members extending between the side rails. First and second outriggers extend across the side rails so as to each have one end extending outwardly of one of the side rails and an opposite end extending outwardly of the other side rail. The first and second outriggers are suitable for receiving the container of proppant thereon. The frame has a first section positioned above the wheels and a second section positioned at a level lower than a level of the first section. The proppant container is placed on the first section.

10 Claims, 3 Drawing Sheets

(56) References Cited

U.S. PATENT DOCUMENTS

| | | |
|---|---|---|
| 711,632 A | 10/1902 | Johnson |
| 917,649 A | 4/1909 | Otto |
| 1,143,641 A | 6/1915 | McGregor |
| 1,331,883 A | 2/1920 | Stuart |
| 1,344,768 A | 6/1920 | Messiter |
| 1,434,488 A | 11/1922 | Forsythe et al. |
| 1,520,560 A | 12/1923 | Burno |
| 1,506,936 A | 9/1924 | Lea |
| 1,526,527 A | 2/1925 | Butler |
| 1,573,664 A | 2/1926 | Wetherill |
| 1,807,447 A | 5/1931 | Smith |
| 1,850,000 A | 3/1932 | Fernand |
| 1,932,320 A | 10/1933 | Steward |
| 1,973,312 A | 9/1934 | Hardinge |
| 2,020,628 A | 11/1935 | Woodruff |
| 2,233,005 A | 2/1941 | Garlinghouse |
| 2,255,448 A | 9/1941 | Morris |
| 2,293,160 A | 8/1942 | Miller et al. |
| 2,368,672 A | 2/1945 | McNamara |
| 2,381,103 A | 8/1945 | Frank |
| 2,385,245 A | 9/1945 | Willoughby |
| 2,423,879 A | 7/1947 | De Frees |
| 2,564,020 A | 8/1951 | Mengel |
| 2,603,342 A | 7/1952 | Martinson |
| 2,616,758 A | 11/1952 | Meyers |
| 2,622,771 A | 12/1952 | Tulou |
| 2,652,174 A | 9/1953 | Shea et al. |
| 2,670,866 A | 3/1954 | Glesby |
| 2,678,145 A | 5/1954 | Ejuzwiak et al. |
| 2,693,282 A | 11/1954 | Sensibar |
| 2,700,574 A | 1/1955 | Tourneau |
| 2,792,262 A | 4/1955 | Hathom |
| 2,774,515 A | 12/1956 | Johansson et al. |
| 2,791,973 A | 5/1957 | Dorey |
| 2,801,125 A | 7/1957 | Page et al. |
| 2,808,164 A | 10/1957 | Glendinning |
| 2,812,970 A | 11/1957 | Martinson |
| 2,837,369 A | 6/1958 | Stopps |
| 2,865,521 A | 12/1958 | Fisher et al. |
| 2,873,036 A | 2/1959 | Noble |
| 2,894,666 A | 7/1959 | Campbell, Jr. |
| 2,988,235 A | 6/1961 | Ronyak |
| 2,994,460 A | 8/1961 | Matthews |
| 3,041,113 A | 6/1962 | Sackett |
| 3,049,248 A | 8/1962 | Heltzel et al. |
| 3,064,832 A | 11/1962 | Heltzel |
| 3,083,879 A | 4/1963 | Coleman |
| 3,090,527 A | 5/1963 | Rensch |
| 3,109,389 A | 11/1963 | Karlsson |
| 3,122,258 A | 2/1964 | Raymond |
| 3,135,432 A | 6/1964 | McKinney |
| 3,163,127 A | 12/1964 | Gutridge et al. |
| 3,187,684 A | 6/1965 | Ortner |
| 3,198,494 A | 8/1965 | Curran et al. |
| 3,199,585 A | 8/1965 | Cronberger |
| 3,248,026 A | 4/1966 | Kemp |
| 3,255,927 A | 6/1966 | Ruppert et al. |
| 3,265,443 A | 8/1966 | Simas |
| 3,270,921 A | 9/1966 | Nadolske et al. |
| 3,281,006 A | 10/1966 | Wei |
| 3,294,306 A | 12/1966 | Areddy |
| 3,318,473 A | 5/1967 | Jones et al. |
| 3,353,599 A | 11/1967 | Swift |
| 3,354,918 A | 11/1967 | Coleman |
| 3,378,152 A | 4/1968 | Warner |
| 3,387,570 A | 6/1968 | Pulcrano et al. |
| 3,396,675 A | 8/1968 | Stevens |
| 3,397,654 A | 8/1968 | Snyder |
| 3,406,995 A | 10/1968 | McCarthy |
| 3,407,971 A | 10/1968 | Oehler |
| 3,425,599 A | 2/1969 | Sammarco et al. |
| 3,455,474 A | 7/1969 | Truncali |
| 3,486,787 A | 12/1969 | Campbell |
| 3,499,694 A | 3/1970 | Coppel |
| 3,508,762 A | 4/1970 | Pratt |
| 3,524,567 A | 8/1970 | Coleman |
| 3,528,570 A | 9/1970 | Pase |
| 3,561,633 A | 2/1971 | Morrison et al. |
| 3,587,834 A | 6/1971 | Dugge |
| 3,596,609 A | 8/1971 | Ortner |
| 3,601,244 A | 8/1971 | Ort et al. |
| 3,602,400 A | 8/1971 | Cooke |
| 3,650,567 A | 3/1972 | Danielson |
| 3,653,521 A | 4/1972 | Bridge |
| 3,661,293 A | 5/1972 | Gerhard et al. |
| 3,692,363 A | 9/1972 | Tenebaum et al. |
| 3,704,797 A | 12/1972 | Suykens |
| 3,721,199 A | 3/1973 | Hassenauer |
| 3,729,121 A | 4/1973 | Cannon |
| 3,734,215 A | 5/1973 | Smith |
| 3,738,511 A | 6/1973 | Lemon et al. |
| 3,752,511 A | 8/1973 | Racy |
| 3,777,909 A | 12/1973 | Rheinfrank |
| 3,785,534 A | 1/1974 | Smith |
| 3,800,712 A | 4/1974 | Krug, Jr. |
| 3,802,584 A | 4/1974 | Sackett |
| 3,817,261 A | 6/1974 | Rogge |
| 3,820,762 A | 6/1974 | Bostrom et al. |
| 3,827,578 A | 8/1974 | Hough |
| 3,840,141 A | 10/1974 | Allom et al. |
| 3,854,612 A | 12/1974 | Snape |
| 3,861,716 A | 1/1975 | Baxter et al. |
| 3,883,005 A | 5/1975 | Stevens |
| 3,909,223 A | 9/1975 | Schmidt |
| 3,913,933 A | 10/1975 | Visser et al. |
| 3,933,100 A | 1/1976 | Dugge |
| 3,963,149 A | 6/1976 | Fassauer |
| 3,970,123 A | 7/1976 | Poulton et al. |
| 3,986,708 A | 10/1976 | Heltzel et al. |
| 3,997,089 A | 12/1976 | Clarke et al. |
| 4,003,301 A | 1/1977 | Norton |
| 4,004,700 A | 1/1977 | Empey |
| 4,057,153 A | 11/1977 | Weaver |
| 4,058,239 A | 11/1977 | Van Mill |
| 4,063,656 A | 12/1977 | Lambert |
| 4,073,410 A | 2/1978 | Melcher |
| 4,125,195 A | 11/1978 | Sasadi |
| 4,138,163 A | 2/1979 | Calvert et al. |
| 4,178,117 A | 12/1979 | Brugler |
| 4,204,773 A | 5/1980 | Bates |
| 4,210,273 A | 7/1980 | Hegele |
| 4,210,963 A | 7/1980 | Ricciardi et al. |
| RE30,358 E | 8/1980 | Sensibar |
| 4,222,498 A | 9/1980 | Brock |
| 4,227,732 A | 10/1980 | Kish |
| 4,232,884 A | 11/1980 | DeWitt |
| 4,239,424 A | 12/1980 | Pavolka |
| 4,245,820 A | 1/1981 | Muryn |
| 4,247,228 A | 1/1981 | Gray et al. |
| 4,247,370 A | 1/1981 | Nijhawan et al. |
| 4,258,953 A | 3/1981 | Johnson |
| 4,265,266 A | 5/1981 | Kierbow et al. |
| 4,278,190 A | 7/1981 | Oory et al. |
| 4,282,988 A | 8/1981 | Hulbert, Jr. |
| 4,287,921 A | 9/1981 | Sanford |
| 4,287,997 A | 9/1981 | Rolfe et al. |
| 4,289,353 A | 9/1981 | Merritt |
| 4,299,597 A | 11/1981 | Oetiker et al. |
| 4,306,895 A | 12/1981 | Thompson et al. |
| 4,329,106 A | 5/1982 | Adler |
| 4,350,241 A | 9/1982 | Wenzel |
| 4,359,176 A | 11/1982 | Johnson |
| 4,363,396 A | 12/1982 | Wolf et al. |
| 4,395,052 A | 7/1983 | Rash |
| 4,397,406 A | 8/1983 | Croley |
| 4,398,653 A | 8/1983 | Daloisio |
| 4,402,392 A | 9/1983 | Fabian et al. |
| 4,407,202 A | 10/1983 | McCormick |
| 4,408,886 A | 10/1983 | Sampson et al. |
| 4,410,106 A | 10/1983 | Kierbow et al. |
| 4,420,285 A | 12/1983 | Loyer et al. |
| 4,427,133 A | 1/1984 | Kierbow et al. |
| 4,428,504 A | 1/1984 | Bassett et al. |
| 4,449,861 A | 5/1984 | Saito et al. |

(56) References Cited

U.S. PATENT DOCUMENTS

| | | | |
|---|---|---|---|
| 4,453,645 A | 6/1984 | Usui et al. |
| 4,474,204 A | 10/1984 | West |
| 4,475,672 A | 10/1984 | Whitehead |
| 4,478,155 A | 10/1984 | Cena et al. |
| 4,483,462 A | 11/1984 | Heintz |
| 4,525,071 A | 6/1985 | Horowitz et al. |
| 4,526,353 A | 7/1985 | Stomp |
| 4,532,098 A | 7/1985 | Campbell |
| 4,534,869 A | 8/1985 | Seibert |
| 4,552,573 A | 11/1985 | Weis |
| 4,569,394 A | 2/1986 | Sweatman et al. |
| 4,570,967 A | 2/1986 | Allnutt |
| 4,571,143 A | 2/1986 | Hellerich |
| 4,608,931 A | 9/1986 | Ruhmann et al. |
| 4,619,531 A | 10/1986 | Dunstan |
| 4,624,729 A | 11/1986 | Bresciani et al. |
| 4,626,155 A | 12/1986 | Hlinsky et al. |
| 4,626,166 A | 12/1986 | Jolly |
| 4,628,825 A | 12/1986 | Taylor et al. |
| 4,639,015 A | 1/1987 | Pitts |
| 4,660,733 A | 4/1987 | Snyder et al. |
| 4,701,095 A | 10/1987 | Berryman et al. |
| 4,715,754 A | 12/1987 | Scully |
| 4,738,774 A | 4/1988 | Patrick |
| 4,741,273 A | 5/1988 | Sherwood |
| 4,801,389 A | 1/1989 | Brannon et al. |
| 4,819,830 A | 4/1989 | Schultz |
| 4,836,735 A | 6/1989 | Dennehy |
| 4,848,605 A | 7/1989 | Wise |
| 4,882,784 A | 11/1989 | Tump |
| 4,889,219 A | 12/1989 | Key |
| 4,901,649 A | 2/1990 | Fehrenbach et al. |
| 4,909,378 A | 3/1990 | Webb |
| 4,909,556 A | 3/1990 | Koskinen |
| 4,917,019 A | 4/1990 | Hesch et al. |
| 4,919,583 A | 4/1990 | Speakman, Jr. |
| 4,923,358 A | 5/1990 | Van Mill |
| 4,946,068 A | 8/1990 | Erickson et al. |
| 4,947,760 A | 8/1990 | Dawson et al. |
| 4,954,975 A | 9/1990 | Kalata |
| 4,956,821 A | 9/1990 | Fenelon |
| 4,964,243 A | 10/1990 | Reiter |
| 4,975,205 A | 12/1990 | Sloan |
| 4,995,522 A | 2/1991 | Barr |
| 5,004,400 A | 4/1991 | Handke |
| 5,042,538 A | 8/1991 | Wiese |
| 5,069,352 A | 12/1991 | Harbolt et al. |
| 5,080,259 A | 1/1992 | Hadley |
| 5,082,304 A * | 1/1992 | Preller .............. B62D 53/061 280/149.2 |
| 5,102,281 A | 4/1992 | Handke |
| 5,102,286 A | 4/1992 | Fenton |
| 5,105,858 A | 4/1992 | Levinson |
| 5,131,524 A | 7/1992 | Uehara |
| 5,190,182 A | 3/1993 | Copas et al. |
| 5,195,861 A | 3/1993 | Handke |
| 5,199,826 A | 4/1993 | Lawrence |
| 5,201,546 A | 4/1993 | Lindsay |
| 5,224,635 A | 7/1993 | Wise |
| 5,253,746 A | 10/1993 | Friesen et al. |
| 5,253,776 A | 10/1993 | Decroix et al. |
| 5,265,763 A | 11/1993 | Heinrici et al. |
| 5,286,158 A | 2/1994 | Zimmerman |
| 5,290,139 A | 3/1994 | Hedrick |
| 5,317,783 A | 6/1994 | Williamson |
| 5,320,046 A | 6/1994 | Hesch |
| 5,324,097 A | 6/1994 | DeCap |
| 5,339,996 A | 8/1994 | Dubbert |
| 5,345,982 A | 9/1994 | Nadeau et al. |
| 5,358,137 A | 10/1994 | Shuert et al. |
| 5,373,792 A | 12/1994 | Pileggi et al. |
| 5,392,946 A | 2/1995 | Holbrook et al. |
| 5,402,915 A | 4/1995 | Hogan |
| 5,413,154 A | 5/1995 | Hurst et al. |
| 5,429,259 A | 7/1995 | Robin |
| 5,441,321 A | 8/1995 | Karpisek |
| 5,465,829 A | 11/1995 | Kruse |
| 5,470,175 A | 11/1995 | Jensen et al. |
| 5,470,176 A | 11/1995 | Corcoran et al. |
| 5,493,852 A | 2/1996 | Stewart |
| 5,507,514 A | 4/1996 | Jacques |
| 5,538,286 A | 7/1996 | Hoff |
| 5,549,278 A | 8/1996 | Sidler |
| 5,564,599 A | 10/1996 | Barber et al. |
| 5,570,743 A | 11/1996 | Padgett et al. |
| 5,590,976 A | 1/1997 | Kilheffer et al. |
| 5,601,181 A | 2/1997 | Lindhorst |
| 5,602,761 A | 2/1997 | Spoerre et al. |
| 5,613,446 A | 3/1997 | DiLuigi et al. |
| 5,617,974 A | 4/1997 | Sawyer |
| 5,647,514 A | 7/1997 | Toth et al. |
| RE35,580 E | 8/1997 | Heider et al. |
| 5,667,298 A | 9/1997 | Musil |
| 5,687,881 A | 11/1997 | Rouse et al. |
| 5,690,466 A | 11/1997 | Gaddis et al. |
| 5,697,535 A | 12/1997 | Coleman |
| 5,706,614 A | 1/1998 | Wiley et al. |
| 5,718,555 A | 2/1998 | Swalheim |
| 5,722,552 A | 3/1998 | Olson |
| 5,722,688 A | 3/1998 | Garcia |
| 5,746,258 A | 5/1998 | Huck |
| 5,761,854 A | 6/1998 | Johnson et al. |
| 5,762,222 A | 6/1998 | Liu |
| 5,772,390 A | 6/1998 | Walker |
| 5,782,524 A | 7/1998 | Heider et al. |
| 5,785,421 A | 7/1998 | Milek |
| 5,803,296 A | 9/1998 | Olson |
| 5,806,863 A | 9/1998 | Heger et al. |
| 5,836,480 A | 11/1998 | Epp et al. |
| 5,845,799 A | 12/1998 | Deaton |
| 5,876,172 A | 3/1999 | Di Rosa |
| 5,906,471 A | 5/1999 | Schwoerer |
| 5,911,337 A | 6/1999 | Bedeker |
| 5,924,829 A | 7/1999 | Hastings |
| 5,927,558 A | 7/1999 | Bruce |
| 5,960,974 A | 10/1999 | Kee |
| 5,971,219 A | 10/1999 | Karpisek |
| 5,993,202 A | 11/1999 | Yamazaki et al. |
| 5,997,099 A | 12/1999 | Collins |
| 6,002,063 A | 12/1999 | Bilak et al. |
| 6,006,918 A | 12/1999 | Hart |
| 6,069,118 A | 5/2000 | Hinkel et al. |
| 6,077,068 A | 6/2000 | Okumura |
| 6,092,974 A | 7/2000 | Roth |
| 6,109,486 A | 8/2000 | Lee |
| 6,120,233 A | 9/2000 | Adam |
| D431,358 S | 10/2000 | Willemsen |
| 6,155,175 A | 12/2000 | Rude et al. |
| 6,186,654 B1 | 2/2001 | Gunteret et al. |
| 6,190,107 B1 | 2/2001 | Lanigan et al. |
| 6,192,985 B1 | 2/2001 | Hinkel et al. |
| 6,196,590 B1 | 3/2001 | Kim |
| 6,205,938 B1 | 3/2001 | Foley et al. |
| 6,210,088 B1 | 4/2001 | Crosby |
| 6,247,594 B1 | 6/2001 | Garton |
| 6,263,803 B1 | 7/2001 | Dohr et al. |
| 6,269,849 B1 | 8/2001 | Fields |
| 6,273,154 B1 | 8/2001 | Laug |
| 6,283,212 B1 | 9/2001 | Hinkel et al. |
| 6,286,986 B2 | 9/2001 | Grimland |
| 6,296,109 B1 | 10/2001 | Nohl |
| 6,306,800 B1 | 10/2001 | Samuel et al. |
| 6,328,156 B1 | 12/2001 | Ostman |
| 6,328,183 B1 | 12/2001 | Coleman |
| 6,364,584 B1 | 4/2002 | Taylor |
| 6,374,915 B1 | 4/2002 | Andrews |
| 6,382,446 B1 | 5/2002 | Hinkle et al. |
| 6,390,742 B1 | 5/2002 | Breeden |
| 6,401,983 B1 | 6/2002 | McDonald et al. |
| 6,412,422 B2 | 7/2002 | Dohr et al. |
| 6,415,909 B1 | 7/2002 | Mitchell et al. |
| 6,416,271 B1 | 7/2002 | Pigott et al. |
| 6,425,725 B1 | 7/2002 | Ehlers |
| 6,457,291 B2 | 10/2002 | Wick |

(56) References Cited

U.S. PATENT DOCUMENTS

| | | |
|---|---|---|
| 6,498,976 B1 | 12/2002 | Ehlbeck et al. |
| 6,505,760 B1 | 1/2003 | Werner |
| 6,508,387 B1 | 1/2003 | Simon et al. |
| 6,508,615 B2 | 1/2003 | Taylor |
| 6,523,482 B2 | 2/2003 | Wingate |
| 6,537,002 B2 | 3/2003 | Gloystein |
| 6,557,896 B1 | 5/2003 | Stobart |
| 6,575,614 B2 | 6/2003 | Tosco et al. |
| 6,660,693 B2 | 12/2003 | Miller et al. |
| 6,663,373 B2 | 12/2003 | Yoshida |
| 6,666,573 B2 | 12/2003 | Grassi |
| 6,675,073 B2 | 1/2004 | Kieman et al. |
| 6,705,449 B2 | 3/2004 | Wagstaffe |
| 6,720,290 B2 | 4/2004 | England et al. |
| 6,772,912 B1 | 8/2004 | Schall et al. |
| 6,774,318 B2 | 8/2004 | Beal et al. |
| 6,776,235 B1 | 8/2004 | England |
| 6,783,032 B2 | 8/2004 | Fons |
| 6,811,048 B2 | 11/2004 | Lau |
| 6,828,280 B2 | 12/2004 | England et al. |
| 6,835,041 B1 | 12/2004 | Albert |
| 6,882,960 B2 | 4/2005 | Miller |
| 6,902,061 B1 | 6/2005 | Elstone |
| 6,915,854 B2 | 7/2005 | England et al. |
| 6,953,119 B1 | 10/2005 | Wening |
| 6,955,127 B2 | 10/2005 | Taylor |
| 6,964,551 B1 | 11/2005 | Friesen |
| 6,968,946 B2 | 11/2005 | Shuert |
| 6,974,021 B1 | 12/2005 | Boevers |
| 7,008,163 B2 | 3/2006 | Russell |
| 7,051,661 B2 | 5/2006 | Herzog et al. |
| 7,084,095 B2 | 8/2006 | Lee et al. |
| 7,104,425 B2 | 9/2006 | Le Roy |
| 7,140,516 B2 | 11/2006 | Bothor |
| 7,146,914 B2 | 12/2006 | Morton et al. |
| 7,201,290 B2 | 4/2007 | Mehus et al. |
| 7,214,028 B2 | 5/2007 | Boasso |
| 7,240,681 B2 | 7/2007 | Saik |
| 7,252,309 B2 | 8/2007 | Eng Soon et al. |
| 7,284,579 B2 | 10/2007 | Elgan et al. |
| 7,284,670 B2 | 10/2007 | Schmid |
| 7,316,333 B2 | 1/2008 | Wegner |
| 7,367,271 B2 | 5/2008 | Early |
| 7,377,219 B2 | 5/2008 | Brandt |
| 7,410,623 B2 | 8/2008 | Mehus et al. |
| 7,475,796 B2 | 1/2009 | Garton |
| 7,500,817 B2 | 3/2009 | Furrer et al. |
| 7,513,280 B2 | 4/2009 | Brashears et al. |
| 7,591,386 B2 | 9/2009 | Hooper |
| 7,640,075 B2 | 12/2009 | Wietgrefe |
| 7,695,538 B2 | 4/2010 | Cheng |
| 7,753,637 B2 | 7/2010 | Benedict et al. |
| 7,798,558 B2 * | 9/2010 | Messier ............ B62D 25/2054 296/184.1 |
| 7,802,958 B2 | 9/2010 | Garcia et al. |
| 7,803,321 B2 | 9/2010 | Lark et al. |
| 7,837,427 B2 | 11/2010 | Beckel |
| 7,841,394 B2 | 11/2010 | McNeel et al. |
| 7,845,516 B2 | 12/2010 | Pessin et al. |
| 7,858,888 B2 | 12/2010 | Lucas et al. |
| 7,867,613 B2 | 1/2011 | Smith |
| 7,891,304 B2 | 2/2011 | Herzog et al. |
| 7,891,523 B2 | 2/2011 | Mehus et al. |
| 7,896,198 B2 | 3/2011 | Mehus et al. |
| 7,921,783 B2 | 4/2011 | Forbes et al. |
| 7,967,161 B2 | 6/2011 | Townsend |
| 7,980,803 B2 | 7/2011 | Brandstätter et al. |
| 7,997,623 B2 | 8/2011 | Williams |
| 8,083,083 B1 | 12/2011 | Mohns |
| 8,201,520 B2 | 6/2012 | Meritt |
| 8,313,278 B2 | 11/2012 | Simmons et al. |
| 8,366,349 B2 | 2/2013 | Beachner |
| 8,375,690 B2 | 2/2013 | LaFargue et al. |
| 8,379,927 B2 | 2/2013 | Taylor |
| 8,387,824 B2 | 3/2013 | Wietgrefe |
| 8,393,502 B2 | 3/2013 | Renyer et al. |
| 8,424,666 B2 | 4/2013 | Berning et al. |
| D688,351 S | 8/2013 | Oren |
| 8,505,780 B2 | 8/2013 | Oren |
| 8,544,419 B1 | 10/2013 | Spalding et al. |
| 8,545,148 B2 | 10/2013 | Wanek-Pusset et al. |
| 8,562,022 B2 * | 10/2013 | Nadeau ................ B62D 21/20 280/785 |
| 8,573,387 B2 | 11/2013 | Trimble |
| 8,573,917 B2 | 11/2013 | Renyer |
| 8,585,341 B1 | 11/2013 | Oren |
| D694,670 S | 12/2013 | Oren |
| 8,616,370 B2 | 12/2013 | Allegretti |
| 8,622,251 B2 | 1/2014 | Oren |
| 8,636,832 B2 | 1/2014 | Stutzman et al. |
| 8,646,641 B2 | 2/2014 | Moir |
| 8,662,525 B1 | 3/2014 | Dierks et al. |
| 8,668,430 B2 | 3/2014 | Oren |
| D703,582 S | 4/2014 | Oren |
| 8,820,559 B2 | 9/2014 | Beitler et al. |
| 8,827,118 B2 | 9/2014 | Oren |
| 8,881,749 B1 | 11/2014 | Smith |
| 8,887,914 B2 | 11/2014 | Allegretti |
| 8,905,266 B2 | 12/2014 | De Brabanter |
| 8,915,691 B2 | 12/2014 | Mintz |
| 9,051,801 B2 | 6/2015 | Mintz |
| 9,052,034 B1 | 6/2015 | Wegner et al. |
| D740,556 S | 10/2015 | Huber |
| 9,162,261 B1 | 10/2015 | Smith |
| 9,267,266 B2 | 2/2016 | Cutler et al. |
| 9,296,572 B2 | 3/2016 | Houghton et al. |
| 9,309,064 B2 | 4/2016 | Sheesley |
| 9,410,414 B2 | 8/2016 | Tudor |
| D780,883 S | 3/2017 | Schaffner et al. |
| D783,771 S | 4/2017 | Stegemoeller et al. |
| D783,772 S | 4/2017 | Stegemoeller, III et al. |
| 2001/0022308 A1 | 9/2001 | Epp et al. |
| 2001/0045338 A1 | 11/2001 | Ransil et al. |
| 2002/0134550 A1 | 9/2002 | Leeson et al. |
| 2002/0139643 A1 | 10/2002 | Peltier et al. |
| 2003/0006248 A1 | 1/2003 | Gill et al. |
| 2003/0111470 A1 | 6/2003 | Fouillet et al. |
| 2003/0145418 A1 | 8/2003 | Ikeda et al. |
| 2003/0156929 A1 | 8/2003 | Russell |
| 2004/0065699 A1 | 4/2004 | Schoer et al. |
| 2004/0074922 A1 | 4/2004 | Bother et al. |
| 2004/0084874 A1 | 5/2004 | McDougall et al. |
| 2004/0206646 A1 | 10/2004 | Goh |
| 2004/0245284 A1 | 12/2004 | Mehus et al. |
| 2005/0158158 A1 | 7/2005 | Porta |
| 2005/0201851 A1 | 9/2005 | Jonkka |
| 2006/0012183 A1 | 1/2006 | Marchiori et al. |
| 2006/0027582 A1 | 2/2006 | Beach |
| 2006/0053582 A1 | 3/2006 | Engel et al. |
| 2006/0091072 A1 | 5/2006 | Schmid et al. |
| 2006/0151058 A1 | 7/2006 | Salaoras et al. |
| 2006/0180062 A1 | 8/2006 | Furrer et al. |
| 2006/0180232 A1 | 8/2006 | Glewwe et al. |
| 2006/0239806 A1 | 10/2006 | Yelton |
| 2006/0267377 A1 | 11/2006 | Lusk et al. |
| 2006/0277783 A1 | 12/2006 | Garton |
| 2006/0289166 A1 | 12/2006 | Stromquist et al. |
| 2007/0096537 A1 * | 5/2007 | Hicks ....................... B60P 1/56 298/33 |
| 2007/0125543 A1 | 6/2007 | McNeel et al. |
| 2008/0008562 A1 | 1/2008 | Beckel et al. |
| 2008/0029546 A1 | 2/2008 | Schuld |
| 2008/0029553 A1 | 2/2008 | Culleton |
| 2008/0058228 A1 | 3/2008 | Wilson |
| 2008/0179054 A1 | 7/2008 | McGough et al. |
| 2008/0179324 A1 | 7/2008 | McGough et al. |
| 2008/0213073 A1 | 9/2008 | Benedict et al. |
| 2008/0226434 A1 | 9/2008 | Smith et al. |
| 2008/0264641 A1 | 10/2008 | Slabaugh et al. |
| 2008/0277423 A1 | 11/2008 | Garton |
| 2009/0038242 A1 | 2/2009 | Cope |
| 2009/0078410 A1 | 3/2009 | Krenek et al. |
| 2009/0278326 A1 * | 11/2009 | Rowland ............... B60P 1/6481 280/33.998 |

(56) References Cited

U.S. PATENT DOCUMENTS

| | | |
|---|---|---|
| 2010/0021258 A1 | 1/2010 | Kim |
| 2010/0037572 A1 | 2/2010 | Cheng |
| 2010/0038143 A1 | 2/2010 | Burnett et al. |
| 2010/0040446 A1 | 2/2010 | Renyer |
| 2010/0065466 A1 | 3/2010 | Perkins |
| 2010/0080681 A1 | 4/2010 | Bain |
| 2010/0108711 A1 | 5/2010 | Wietgrefe |
| 2010/0129193 A1 | 5/2010 | Sherrer |
| 2010/0199668 A1 | 8/2010 | Coustou et al. |
| 2010/0278621 A1 | 11/2010 | Redekop |
| 2010/0288603 A1 | 11/2010 | Schafer |
| 2010/0320727 A1 | 12/2010 | Haut et al. |
| 2011/0011893 A1 | 1/2011 | Cerny |
| 2011/0017693 A1 | 1/2011 | Thomas |
| 2011/0101040 A1 | 5/2011 | Weissbrod |
| 2011/0109073 A1 | 5/2011 | Williams |
| 2011/0127178 A1 | 6/2011 | Claussen |
| 2011/0160104 A1 | 6/2011 | Wu et al. |
| 2011/0162838 A1 | 7/2011 | Mackenzie et al. |
| 2011/0168593 A1 | 7/2011 | Neufeld et al. |
| 2011/0222983 A1 | 9/2011 | Dugic et al. |
| 2011/0297702 A1 | 12/2011 | Hildebrandt et al. |
| 2012/0090956 A1 | 4/2012 | Brobst |
| 2012/0103848 A1 | 5/2012 | Allegretti et al. |
| 2012/0219391 A1 | 8/2012 | Teichrob et al. |
| 2012/0255539 A1 | 10/2012 | Kolecki |
| 2013/0004272 A1 | 1/2013 | Mintz |
| 2013/0022441 A1 | 1/2013 | Uhryn et al. |
| 2013/0206415 A1 | 8/2013 | Sheesley |
| 2013/0209204 A1 | 8/2013 | Sheesley |
| 2013/0233545 A1 | 9/2013 | Mahoney |
| 2013/0284729 A1 | 10/2013 | Cook et al. |
| 2013/0309052 A1 | 11/2013 | Luharuka |
| 2013/0323005 A1 | 12/2013 | Rexius et al. |
| 2014/0020765 A1 | 1/2014 | Oren |
| 2014/0020892 A1 | 1/2014 | Oren |
| 2014/0023465 A1 | 1/2014 | Oren et al. |
| 2014/0034662 A1 | 2/2014 | Chalmers et al. |
| 2014/0044507 A1 | 2/2014 | Naizer et al. |
| 2014/0077484 A1 | 3/2014 | Harrell |
| 2014/0083554 A1 | 3/2014 | Harris |
| 2014/0093319 A1 | 4/2014 | Harris et al. |
| 2014/0097182 A1 | 4/2014 | Sheesley |
| 2014/0166647 A1 | 6/2014 | Sheesley |
| 2014/0203046 A1 | 7/2014 | Allegretti |
| 2014/0234059 A1 | 8/2014 | Thomeer |
| 2014/0305769 A1 | 10/2014 | Eiden et al. |
| 2014/0321950 A1 | 10/2014 | Krenek et al. |
| 2015/0004895 A1 | 1/2015 | Hammers et al. |
| 2015/0069052 A1 | 3/2015 | Allegretti et al. |
| 2015/0086307 A1 | 3/2015 | Stefan |
| 2015/0107822 A1 | 4/2015 | Tudor |
| 2015/0110565 A1 | 4/2015 | Harris |
| 2015/0115589 A1 | 4/2015 | Thiessen |
| 2015/0159232 A1 | 6/2015 | Zucchi et al. |
| 2015/0209829 A1 | 7/2015 | De Siqueira et al. |
| 2015/0284183 A1 | 10/2015 | Houghton et al. |
| 2016/0148813 A1 | 5/2016 | Rogers et al. |
| 2016/0177678 A1 | 6/2016 | Morris et al. |
| 2016/0185522 A1 | 6/2016 | Herman et al. |
| 2016/0273355 A1 | 9/2016 | Gosney et al. |
| 2016/0280480 A1 | 9/2016 | Smith et al. |
| 2017/0129721 A1 | 5/2017 | Harris et al. |

FOREIGN PATENT DOCUMENTS

| | | |
|---|---|---|
| CN | 201390486 | 1/2010 |
| CN | 201881469 | 6/2011 |
| CN | 103350017 | 10/2013 |
| DE | 3108121 | 9/1982 |
| DE | 3342281 | 6/1985 |
| DE | 4217329 | 5/1993 |
| EP | 0019967 | 12/1980 |
| EP | 322283 | 6/1989 |
| EP | 0564969 | 10/1993 |
| EP | 0997607 | 5/2000 |
| EP | 1052194 | 11/2000 |
| EP | 1167236 | 1/2002 |
| EP | 1775190 | 4/2007 |
| EP | 2062832 | 5/2009 |
| EP | 2311757 | 4/2011 |
| FR | 2173445 | 10/1973 |
| FR | 2640598 | 6/1990 |
| GB | 1296736 | 11/1972 |
| GB | 2374864 | 10/2002 |
| JP | S4871029 | 9/1973 |
| JP | S4876041 | 9/1973 |
| JP | S58161888 | 10/1983 |
| JP | 410087046 | 4/1998 |
| JP | 10264882 | 10/1998 |
| MX | 2012011046 | 5/2013 |
| WO | 9008082 | 7/1990 |
| WO | 9202437 | 2/1992 |
| WO | 9301997 | 2/1993 |
| WO | 9306031 | 4/1993 |
| WO | 1996025302 | 8/1996 |
| WO | 2006039757 | 4/2006 |
| WO | 2007005054 | 1/2007 |
| WO | 2007061310 | 5/2007 |
| WO | 2010026235 | 3/2010 |
| WO | 2011099358 | 8/2011 |
| WO | 2012021447 | 2/2012 |
| WO | 2012058059 | 5/2012 |

OTHER PUBLICATIONS

International Search Report for related International Application No. PCT/US2013/035442, dated Jun. 23, 2013.
International Search Report for related International Application No. PCT/US2013/032819, dated May 23, 2013.
International Search Report for related International Application No. PCT/US2013/049028, dated Mar. 4, 2014.
International Preliminary Report on Patentability for PCT/US2012/066639, dated Feb. 26, 2011.
International Preliminary Report on Patentability for PCT/US2013/032819, dated Sep. 23, 2014.
International Search Report for PCT/US2015/012990, dated May 6, 2015. (15 pages).
FS-35 Desert Frac-Sanders. NOV (National Oilwell Varco). Mar. 19, 2012. (https://web.archive.org/web/20120319070423/http://www.nov.com/Well_Service_and_Completion/Frac_Sand_Handling_Equipment/Frac_Sanders/FS-35.aspx).
File History for Provisional U.S. Appl. No. 61/538,616, Robert A. Harris, Sep. 23, 2011. (21 pages).
International Search Report for PCT/US2015/024810, dated Jul. 8, 2015. (13 pages).
European Search Report for Application No. 15167039.5, dated Sep. 8, 2015. (7 pages).
SandBox Logistics, "Mine to Wellhead Logistics," Houston, TX, May 2013.
SandBox Logistics, screenshots from video made in Apr. 2013 and publicly shown in May 2013, Arnegard, North Dakota.
International Search Report for PCT/US15/35635, dated Oct. 30, 2015. (12 pages).
PCT International Search Report for PCT/US15/49074, dated Dec. 17, 2015. (11 pages).
PCT International Search Report for PCT/US15/57601, dated May 6, 2016. (11 pages).
Frac Sand Primer by Brian D. Olmen, Kelrick, LLC, from Hydraulic Fracturing by Michael Berry Smith and Carl Montgomery (CRC Press, Dec. 16, 2015), p. 384. Mar. 2, 2017.
Premier Silica LLC, Sands Application in the Energy Market, Irving, TX, Copyright 2016.
Getty, John, Montana Tech; ASTM International, Overview of Proppants and Existing Standards and Practices, Jacksonville, FL, Jan. 29, 2013.
Non-Final Office Action dated Oct. 27, 2016 for co-pending U.S. Appl. No. 15/219,676.

(56) References Cited

OTHER PUBLICATIONS

Non-Final Office Action dated Nov. 9, 2016 for co-pending U.S. Appl. No. 14/948,494.
Final Office Action dated Nov. 4, 2016 for co-pending U.S. Appl. No. 14/738,485.
Non-Final Office Action dated May 13, 2016 for co-pending U.S. Appl. No. 14/986,826.
Final Office Action dated Sep. 15, 2016 for co-pending U.S. Appl. No. 14/922,836.
Non-Final Office Action dated Feb. 4, 2016 for co-pending U.S. Appl. No. 14/922,836.
Final Office Action dated Aug. 25, 2016 for co-pending U.S. Appl. No. 14/927,614.
Non-Final Office Action dated Mar. 1, 2016 for co-pending U.S. Appl. No. 14/927,614.
Non-Final Office Action dated Apr. 29, 2016 for co-pending U.S. Appl. No. 14/943,182.
Final Office Action dated Sep. 15, 2016 for co-pending U.S. Appl. No. 14/882,973.
Non-Final Office Action dated Feb. 11, 2016 for co-pending U.S. Appl. No. 14/882,973.
Non-Final Office Action dated Aug. 11, 2016 for co-pending U.S. Appl. No. 13/625,675.
Final Office Action dated Nov. 11, 2015 for co-pending U.S. Appl. No. 13/625,675.
Non-Final Office Action dated Mar. 11, 2015 for co-pending U.S. Appl. No. 13/625,675.
Arrows Up, Inc., Jumbo BTS—Bulk Transport System, Aug. 1, 2014.
Arrows Up, Inc., Reusable Packaging Association, Member Spotlight: John Allegretti, President & CEO, Arrows Up, Inc., Jun. 23, 2016.
Seed Today, Arrows Up, Inc. Bulk Transport System (BTS), Country Journal Publishing Co., Decatur, IL, Mar. 2, 2011.
SeedQuest, Arrows Up, Inc. launches innovative bulk transport system for see, Barrington, IL, Mar. 2, 2011.
Monster Tanks, Inc., Sand Monster Website, http://monstertanksinc.com/sandmonster.html, 2012.
Solaris Oilfield Infrastructure, Mobile Sand Silo System, 2016.
Final Office Action dated Sep. 27, 2016 for co-pending U.S. Appl. No. 13/555,635.
Non-Final Office Action dated Mar. 23, 2016 for co-pending U.S. Appl. No. 13/555,635.
Final Office Action dated Jul. 30, 2015 for co-pending U.S. Appl. No. 13/555,635.
Non-Final Office Action dated Oct. 22, 2014 for co-pending U.S. Appl. No. 13/555,635.
Final Office Action dated Jun. 21, 2016 for co-pending U.S. Appl. No. 13/628,702.
Non-Final Office Action dated Feb. 23, 2016 for co-pending U.S. Appl. No. 13/628,702.
Final Office Action dated Sep. 22, 2015 for co-pending U.S. Appl. No. 13/628,702.
Non-Final Office Action dated Jul. 28, 2015 for co-pending U.S. Appl. No. 13/628,702.
Final Office Action dated Mar. 24, 2015 for co-pending U.S. Appl. No. 13/628,702.
Non-Final Office Action dated Sep. 18, 2014 for co-pending U.S. Appl. No. 13/628,702.
Final Office Action dated Jun. 27, 2016 for co-pending U.S. Appl. No. 14/831,924.
Non-Final Office Action dated Feb. 16, 2016 for co-pending U.S. Appl. No. 14/831,924.
Final Office Action dated Jun. 27, 2016 for co-pending U.S. Appl. No. 14/923,920.
Non-Final Office Action dated Feb. 9, 2016 for co-pending U.S. Appl. No. 14/923,920.
Final Office Action dated Sep. 15, 2016 for co-pending U.S. Appl. No. 14/943,111.
Non-Final Office Action dated Apr. 5, 2016 for co-pending U.S. Appl. No. 14/943,111.
Final Office Action dated Jul. 18, 2016 for co-pending U.S. Appl. No. 14/948,494.
Non-Final Office Action dated Apr. 8, 2016 for co-pending U.S. Appl. No. 14/948,494.
Non-Final Office Action dated Sep. 6, 2016 for co-pending U.S. Appl. No. 15/144,296.
Non-Final Office Action dated Jul. 25, 2016 for co-pending U.S. Appl. No. 13/660,855.
Final Office Action dated Apr. 28, 2016 for co-pending U.S. Appl. No. 13/660,855.
Non-Final Office Action dated Oct. 6, 2015 for co-pending U.S. Appl. No. 13/660,855.
Final Office Action dated Aug. 6, 2015 for co-pending U.S. Appl. No. 13/660,855.
Non-Final Office Action dated Apr. 29, 2015 for co-pending U.S. Appl. No. 13/660,855.
Final Office Action dated Dec. 17, 2014 for co-pending U.S. Appl. No. 13/660,855.
Non-Final Office Action dated Sep. 4, 2014 for co-pending U.S. Appl. No. 13/660,855.
Final Office Action dated Sep. 24, 2013 for co-pending U.S. Appl. No. 13/660,855.
Non-Final Office Action dated May 14, 2013 for co-pending U.S. Appl. No. 13/660,855.
Non-Final Office Action dated Jul. 5, 2016 for co-pending U.S. Appl. No. 14/996,362.
Non-Final Office Action dated Jul. 6, 2016 for co-pending U.S. Appl. No. 15/144,450.
Final Office Action dated Sep. 29, 2016 for co-pending U.S. Appl. No. 13/768,962.
Non-Final Office Action dated Apr. 5, 2016 for co-pending U.S. Appl. No. 13/768,962.
Final Office Action dated Oct. 9, 2015 for co-pending U.S. Appl. No. 13/768,962.
Non-Final Office Action dated May 1, 2015 for co-pending U.S. Appl. No. 13/768,962.
Non-Final Office Action dated Jul. 18, 2016 for co-pending U.S. Appl. No. 15/152,744.
Non-Final Office Action dated Apr. 13, 2016 for co-pending U.S. Appl. No. 14/738,485.
Non-Final Office Action dated Sep. 7, 2016 for co-pending U.S. Appl. No. 14/841,942.
Final Office Action dated May 12, 2016 for co-pending U.S. Appl. No. 14/841,942.
Non-Final Office Action dated Nov. 30, 2015 for co-pending U.S. Appl. No. 14/841,942.
Non-Final Office Action dated Jul. 21, 2016 for co-pending U.S. Appl. No. 15/083,596.
Non-Final Office Action dated Aug. 19, 2016 for co-pending U.S. Appl. No. 15/084,613.
Non-Final Office Action dated Sep. 6, 2016 for co-pending U.S. Appl. No. 15/143,942.
Final Office Action dated Sep. 1, 2016 for co-pending U.S. Appl. No. 14/848,447.
Non-Final Office Action dated Apr. 8, 2016 for co-pending U.S. Appl. No. 14/848,447.
Grit Energy Solutions, LLC, Fidelity, Screenshots from video dated May 16, 2014.
Grit Energy Solutions, LLC, Gate, Screenshots from video dated Dec. 6, 2013, https://www.youtube.com/user/gritstack.
Grit Energy Solutions, LLC, Screen, Screenshots from video dated Dec. 6, 2013, https://www.youtube.com/user/gritstack.
Grit Energy Solutions, LLC, The Grit Stack System—Live Frac, Screenshots from video dated Jun. 15, 2015, https://www.youtube.com/user/gritstack.
Grit Energy Solutions, LLC, The Grit Stack System, Screenshots from video dated Feb. 7, 2014, https://www.youtube.com/user/gritstack.
SandBox Logistics, LLC, screenshots from video dated Sep. 19, 2013.

(56) References Cited

OTHER PUBLICATIONS

SandBox Logistics, LLC, screenshots from video dated Aug. 22, 2014.
SandBox Logistics, LLC, screenshots from video dated Oct. 11, 2013.
SandBox Logistics, LLC, screenshots from video dated Apr. 10, 2013.
Non-Final Office Action dated Dec. 28, 2016 for co-pending U.S. Appl. No. 13/628,702.
Non-Final Office Action dated Jan. 13, 2017 for co-pending U.S. Appl. No. 14/923,920.
Final Office Action dated Jan. 12, 2017 for co-pending U.S. Appl. No. 14/841,942.
Non-Final Office Action dated Dec. 23, 2016 for co-pending U.S. Appl. No. 14/485,686.
Non-Final Office Action dated Jan. 27, 2017 for co-pending U.S. Appl. No. 14/485,687.
Non-Final Office Action dated Dec. 20, 2016 for co-pending U.S. Appl. No. 14/831,924.
Final Office Action dated Jan. 19, 2017 for co-pending U.S. Appl. No. 13/660,855.
Final Office Action dated Nov. 25, 2016 for co-pending U.S. Appl. No. 15/152,744.
Non-Final Office Action dated Dec. 15, 2016 for co-pending U.S. Appl. No. 14/848,447.
Non-Final Office Action dated Dec. 9, 2016 for co-pending U.S. Appl. No. 14/927,614.
International Search Report for PCT Application No. PCT/US2016/050859 dated Dec. 9, 2016.
Final Office Action dated Jun. 1, 2017 for co-pending U.S. Appl. No. 13/628,702.
Final Office Action dated Jul. 3, 2017 for co-pending U.S. Appl. No. 14/923,920.
Non-Final Office Action dated Jun. 28, 2017 for co-pending U.S. Appl. No. 15/589,185.
Final Office Action dated Jun. 7, 2017 for co-pending U.S. Appl. No. 14/848,447.
Final Office Action dated Jun. 28, 2017 for co-pending U.S. Appl. No. 14/485,687.
Final Office Action dated Jun. 6, 2017 for co-pending U.S. Appl. No. 14/927,614.
Final Office Action dated Jun. 21, 2017 for co-pending U.S. Appl. No. 14/943,182.
Non-Final Office Action dated Apr. 3, 2017 for co-pending U.S. Appl. No. 13/555,635.
Non-Final Office Action dated Feb. 14, 2017 for co-pending U.S. Appl. No. 14/943,111.
Final Office Action dated Mar. 7, 2017 for co-pending U.S. Appl. No. 15/144,296.
Non-Final Office Action dated Apr. 6, 2017 for co-pending U.S. Appl. No. 13/768,962.
Non-Final Office Action dated Mar. 6, 2017 for co-pending U.S. Appl. No. 15/152,744.
Non-Final Office Action dated Feb. 24, 2017 for co-pending U.S. Appl. No. 14/943,182.
International Search Report and Written Opinion for PCT/US2017/012271, dated May 22, 2017.
Non-Final Office Action dated Apr. 24, 2017 for co-pending U.S. Appl. No. 14/738,485.
Final Office Action dated May 4, 2017 for co-pending U.S. Appl. No. 15/143,942.
Final Office Action dated May 30, 2017 for co-pending U.S. Appl. No. 13/625,675.
Final Office Action dated Apr. 19, 2017 for co-pending U.S. Appl. No. 15/219,640.
Non-Final Office Action dated Jun. 1, 2017 for co-pending U.S. Appl. No. 15/219,640.
Final Office Action dated May 2, 2017 for co-pending U.S. Appl. No. 15/219,676.
Non-Final Office Action dated May 10, 2017 for co-pending U.S. Appl. No. 14/882,973.
Non-Final Office Action dated Aug. 3, 2017 for co-pending U.S. Appl. No. 15/219,676.
Beckwith, Robin, Proppants: Where in the World, Proppant Shortage, JPT, Apr. 2011 (6 pages).
Kullman, John, The Complicated World of Proppant Selection . . . , South Dakota School of Mines & Technology, Oct. 2011 (65 pages).
Lafollette, Randy, Key Considerations for Hydraulic Fracturing of Gas Shales, BJ Services Company, Sep. 3, 2010 (53 pages).
WW Trailers Inc., Model GN2040EZ datasheet, Portland, OR, Jan. 2007 (4pages).
WW Trailers Inc., Model GN204S9A datasheet, Portland, OR, Jan. 2007 (4pages).
Non-Final Office Action dated Jul. 26, 2017 for co-pending U.S. Appl. No. 15/463,201.
Final Office Action dated Jul. 27, 2017 for co-pending U.S. Appl. No. 14/738,485.
Yergin, Daniel, The Quest: Energy, Security, and the Remaking of the Modern World, 2011.
Gold, Russell, The Boom: How Fracking Ignited the American Energy Revolution and Changed the World, 2014.
Yergin, Daniel, Stepping on the Gas, Wall Street Journal, Apr. 2, 2011.
Raimi, Daniel et al., Dunn County and Watford City, North Dakota: A case study of the fiscal effects of Bakken shale development, Duke University Energy Initiative, May 2016.
Local Economic Impacts Related to Marcellus Shale Development, The Center for Rural Pennyslvania, Sep. 2014.
Eagle Ford Shale Task Force Report, Railroad Commission of Texas, Convened and Chaired by David Porter, Mar. 2013.
*Sandbox Logistics LLC et al v. Grit Energy Solutions LLC*, 3:16-cv-00012, 73.Parties' P.R. 4-3 Joint Claim Construction and Prehearing Statement by Oren Technologies LLC, SandBox Enterprises LLC, SandBox Logistics LLC, Nov. 17, 2016.
Beard, Tim, Fracture Design in Horizontal Shale Wells—Data Gathering to Implementation, EPA Hydraulic Fracturing Workshop, Mar. 10-11, 2011.
Economic Impact of the Eagle Ford Shale, Center for Community and Business Research at the University of Texas at San Antonio's Institute for Economic Development, Sep. 2014.
Kelsey, Timothy W. et al., Economic Impacts of Marcellus Shale in Pennsylvania: Employment and Income in 2009, The Marcellus Shale Education & Training Center, Aug. 2011.
2006 Montana Commercial Vehicle Size and Weight and Safety Trucker's Handbook, Montana Department of Transportation Motor Carrier Services Division, Fifth Edition, Jun. 2010.
Budzynski, Brian W., Never Meant to Take the Weight, Roads & Bridges, Apr. 2015.
Interstate Weight Limits, 23 C.F.R. § 658, Apr. 1, 2011.
VIN Requirements, 49 C.F.R. § 565, Oct. 1, 2011.
Benson, Mary Ellen et al., Frac Sand in the United States—A Geological and Industry Overview, U.S. Department of the Interior, U.S. Geological Survey, 2015-2017.
Beekman, Thomas J. et al., Transportation Impacts of the Wisconsin Fracture Sand Industry, Wisconsin Department of Transportation, Mar. 2013.
U.S. Silica Company, Material Safety Data Sheet, Jan. 2011.
Texas Transportation Code, Chapter 621, General Provisions Relating to Vehicle Size and Weight (Sec. 621.101 effective Sep. 1, 2005 and Section 621.403 effective Sep. 1, 1995).
Garner, Dwight, Visions of an Age When Oil Isn't King, New York Times, Sep. 20, 2011.

\* cited by examiner

TRAILER ASSEMBLY FOR TRANSPORT OF CONTAINERS OF PROPPANT MATERIAL

1. RELATED APPLICATIONS

The present application is a continuation which claims priority to and the benefit of U.S. application Ser. No. 13/854,405, filed on Apr. 1, 2013, and titled "Trailer Assembly for Transport of Containers of Proppant Material," which is incorporated herein by reference in its entirety.

BACKGROUND

2. Field of the Invention

The present invention relates to container trailer assemblies. Additionally, the present invention relates to systems and apparatus for the transport of proppant material. More particularly, the present invention relates to a trailer assembly that is particularly suitable for the transport of containers of proppant material.

3. Description of Related Art Including Information Disclosed Under 37 CFR 1.97 and 37 CFR 1.98

Hydraulic fracturing is the propagation of fractions in a rock layer caused by the presence of pressurized fluid. Hydraulic fractures may form naturally, in the case of veins or dikes, or may be man-made in order to release petroleum, natural gas, coal seam gas, or other substances for extraction. Fracturing is done from a wellbore drilled into reservoir rock formations. The energy from the injection of a highly-pressurized fracking fluid creates new channels in the rock which can increase the extraction rates and ultimate recovery of fossil fuels. The fracture width is typically maintained after the injection by introducing a proppant into the injected fluid. Proppant is a material, such as grains of sand, ceramic, or other particulates, that prevent the fractures from closing when the injection is stopped.

With the rise of hydraulic fracturing over the past decade, there is a steep climb in proppant demand. Global supplies are currently tight. The number of proppant suppliers worldwide has increased since 2000 from a handful to well over fifty sand, ceramic proppant and resin-coat producers.

By far the dominant proppant is silica sand, made up of ancient weathered quartz, the most common mineral in the Earth's continental crust. Unlike common sand, which often feels gritty when rubbed between the fingers, sand used as a proppant tends to roll to the touch as a result of its round, spherical shape and tightly-graded particle distribution. Sand quality is a function of both deposit and processing. Grain size is critical, as any given proppant must reliably fall within certain mesh ranges, subject to downhole conditions and completion design. Generally, coarser proppant allows the higher flow capacity due to the larger pore spaces between grains. However, it may break down or crush more readily under stress due to the relatively fewer grain-to-grain contact points to bear the stress often incurred in deep oil- and gas-bearing formations.

Typically, in any hydraulic fracturing operation, a large amount of such proppant is required. The transport of proppant presents significant issues and difficulties. Fundamentally, governmental roads requirements establish a limit as to the amount of weight that can be transported over the roads. These weight limits are established so as to avoid damage to the structural integrity of the road and also damage to any bridges, overpasses, or other structures associated with the road. Additionally, there are height requirements on such transport vehicles. Conventionally, all transport vehicles should have a height of less than 13½ feet. As such, the transport vehicle can travel on virtually all roads without issues associated with low overlying bridges and overpasses. Additionally, in the transport of proppant, there are a variety of issues related to the safety of the transport. For example, structures should be provided so as to avoid any shifting of the proppant contents in the container that is being transported. Further, concern should also be directed to the center of gravity associated with the contained proppant on the vehicle. If the center of gravity is too high, then there is an increased likelihood of a potential overturning of the vehicle and a reduction in the handling capability of the vehicle.

Conventionally, a 20 foot ISO container could be utilized so as to transport proppant on a conventional container trailer. Unfortunately, experiments have determined that the transport of sand in such conventional containers is not suitable. If the 20 foot ISO is filled with proppant material, then it would certainly exceed the government weight limits on the road. If the 20 foot ISO container were filled with a lesser amount of proppant material, the material could more easily shift in the container and create a dangerous driving condition. Additionally, if a 20 foot ISO container is minimally filled with proppant, the angle of repose of the proppant in the container would make it extremely difficult to completely empty the proppant material from the container. As such, it would not be possible to empty a conventional 20 foot container. As such, a need has developed so as to avoid the use of a 20 foot container for the transport of proppant material.

Importantly, the weight limits that are imposed by government authorities on the transport of goods on road requires that the weight limit be under 80,000 pounds. This weight limit will include the truck, the trailer and the load that is being transported by the truck and trailer. As such, the weight of the vehicle is of a significant concern when determining the amount of proppant that can be moved by a trailer over the roads. As such, it is desirable to minimize the weight of the truck and trailer while still preserving the structural integrity of the truck and trailer.

In the earlier patent applications by the present inventor (for example, U.S. patent application Ser. No. 13/628,702) a 10 foot ISO container was proposed. In this earlier application, it is found that the 10 foot ISO container has a height of 8.5 feet. As such, such a container would contain less than an optimal amount of proppant. In order to deliver the desired 46,500 pounds of proppant to the site, and in order to provide a proper angle of repose of the proppant material within the container, it was found that an ISO container with a height of 9.5 feet was necessary. If such a container of an increased height were actually used on a conventional container trailer, it would exceed the height requirements for the vehicle. If the conventional container trailer were used, the total weight of the vehicle would be in excess of the 80,000 pound limit. Additionally, the placement of the container on the top of a conventional container trailer would increase the center of gravity to the trailer and, as such, increase the potential for vehicle overturns and reduce the handling capability of the truck. Additionally, a standard container trailer could cause the operator to place the sand container in an improper location along the length of the trailer such that the weight is not properly centered for proper transport.

In the past, various patents have issued relating to container trailers. For example, U.S. Pat. No. 3,958,707, issued on May 25, 1976 to D. L. Deppe, discloses a container transport trailer having a bottomless U-shaped support frame including a cross member and a pair of side members. A lift member is connected to the forward end of the trailer and cooperates with a pair of support arms pivotally connected to the rear ends of the side members of the U-shaped frame to engage against the rear portion of the article.

U.S. Pat. No. 5,839,864, issued on Nov. 24, 1998 to S. K Reynard, teaches a locking system for a container-carrying trailer having a loading platform on which a container can be mounted. The locking system comprises a forward pair of locking devices and a rearward pair of locking devices mounted at forward and rear ends of the loading platform. The locking device is cooperative with respective corner fittings of the container in order to clamp the container to the loading platform.

U.S. Pat. No. 6,109,684, issued on Aug. 29, 2000 to M. A. Reitnouer, discloses a flatbed trailer design that unitizes the three main components of a trailer bed, i.e. the main rails, the cross members and the floor, to create a lightweight and stronger trailer. The trailer design comprises two main rails having dual webs and a plurality of shouldered cross members. These dual web main rails and shouldered cross members have top flanges that are formed by the upper plane of the flooring members. In addition, intermediate flooring supports are used between cross members.

U.S. Pat. No. 7,866,933, issued on Jan. 11, 2011 to Welch et al., teaches a container trailer that includes a coupling to attach the trailer to a tractor, and a frame attached to the coupling. The frame is positioned as a single unit about a container such that the frame can be attached to the container in four regions of the container to lift the container. The trailer has road wheels for long-haul transportation. The trailer frame can be positioned about the container by laterally expanding and retracting, pivoting about a horizontal axis, and pivoting about a vertical axis.

U.S. Pat. No. 8,182,193, issued on May 22, 2012 to Gaudet et al., shows a trailer for transporting freight a container. The trailer has a frame with a front frame section which is adapted to be coupled to a suitable road vehicle. A pair of displaceable horizontal side beams are secured to the front frame section and are provided with a hingeable rear gate formed by a pair of hinge arms. Each of the side beams has a suspension assembly to support a tandem wheel arrangement. Retractable vertical lifting piston cylinders are secured to a portion of the front frame and to the pair of hinge arms and are actuable to lift the pair of horizontal side beams and its wheels above a ground surface. Laterally extendable piston cylinders are also secured to the front frame and the hinge arms to displace the horizontal side beams outwardly and inwardly with respect to one another when lifted off the ground surface. Container lifting posts are secured to opposed ends of the front frame section and the hinge arms for removable connection to a container positioned between the side beams to lift and lower the container therebetween. Container connectors are secured to each of the side beams for securing a container thereto for transportation.

U.S. Patent Publication No. 2013/0004272, published on Jan. 3, 2013 to M. Mintz, provides an apparatus for transporting proppant for use in standard ISO intermodal container and for delivering the proppant to well sites. The apparatus is configured for being inserted into a standard 20 foot container and adapted for transporting frac sand and proppant from a quarry to a well site. A plurality of inlet ports are disposed atop the roof, with the inlet ports receiving the proppant from a proppant supply source into a funnel/hopper. A plurality of outlet ports received the proppant within the funnel/hopper and deliver the proppant to the well site. An in situ valve is disposed within the hopper assembly for effectuating industry standard continuous pressurized discharge of stored proppant material into a discharge pipe for delivery downhole.

It is an object of the present invention to provide a trailer assembly that is able to effectively transport a 10 foot ISO container.

It is another object of the present invention to provide a trailer assembly that facilitates the transport of proppant in containers positioned thereon.

It is another object of the present invention to provide a trailer assembly which is of minimal of weight so as to facilitate the delivery of a maximum amount of proppant within the container positioned thereon.

It is still another object of the present invention to provide a trailer assembly which minimizes the center of gravity of the proppant containing container positioned thereon.

It is still another object of the present invention to provide a trailer assembly which allows multiple empty proppant containers to be positioned thereon.

It is still a further object of the present invention to provide a trailer assembly which allows the proppant-containing container to meet height and weight requirements during the transport of proppant.

It is still another object of the present invention to provide a trailer assembly which is easy to use, relatively inexpensive and easy to manufacture.

These and other objects and advantages of the present invention will become apparent from a reading of the attached specification and appended claims.

BRIEF SUMMARY OF THE INVENTION

The present invention is a trailer assembly which comprises a frame having a first section and a second section, and a plurality of wheels rotatably mounted below the first section so as to allow the frame to move along an underlying surface. The first section is positioned at a higher level than the second section. Each of the first and second sections has length of at least 10 feet. The first section is suitable for receiving a first sand container thereon. The second section is also suitable for receiving a second sand container thereon. The frame has a connector section suitable for connection to a towing vehicle.

The first section has a planar top surface. The second section has a planar top surface. The first section has a top surface extending in a plane approximate 1 foot 9 inches above a plane in which a top surface of the second section extends.

The frame has a first side rail and a second side rail extending in spaced parallel relation to each other. The frame also has a plurality of cross members extending between the first side rail and the second side rail. The first section has a first outrigger extending across the first and second side rails so as to have a first end extending outwardly of the first side rail and a second end extending outwardly of the second side rail. The first section has a second outrigger extending across the first and second side rails so as to have a first end extending outwardly of the first side rail and a second end extending outwardly of the second side rail. The first and second outriggers are suitable for attachment to an underside of the first container.

The second section has a first outrigger extending across the first and second side rails so as to have a first end extending outwardly of the first side rail and a second end extending outwardly of the second side rail. The second section also has a second outrigger extending across the first and second side rails so as to have a first end extending outwardly of the first side rail and a second end extending outwardly of the second side rail. The first and second outriggers of the second section are suitable for attachment to the underside of the second container. The first outrigger is positioned in transverse relationship to the first and second side rails. The second outrigger is positioned in transverse relation to the first and second side rails. The first outrigger of the first section is positioned at an end of the frame. The second outrigger of the first section is positioned adjacent the second section.

The plurality of wheels are positioned below and between the first and second outriggers of the first section. The connector section is a gooseneck connector having a portion extending upwardly from an end of the second section opposite the first section. The connector section has another portion extending away from the second section.

In the present invention, the first container would be an empty container. The empty container would be positioned directly above the wheels. In the present invention, the second container would be a container that is filled with proppant material. When the second container is filled with proppant material, it is placed on the second section of the trailer. Under these circumstances, there would be no first container placed on the first section. When the second container is empty, a pair of containers, i.e. the first container and the second container, can be respectfully placed on the first section and the second section. As such, when the trailer is used to transport proppant to a well site, the second container (filled with proppant) is placed on the second section of the trailer and the truck can serve to tow the trailer to the well site. At the well site, an empty container can he placed on the second section and another empty container can he placed on the first section. As such, a pair of empty containers can be transported from the well site.

The foregoing Section is intended to describe, in generality, the preferred embodiment of the present invention. It is understood that modifications to this preferred embodiment can be made within the scope of the present invention. As such, this Section should not be construed, in any way as limiting of the broad scope of the present invention. The present invention should only be limited by the following claims and their legal equivalents.

DETAILED DESCRIPTION OF THE INVENTION

Figure 1:
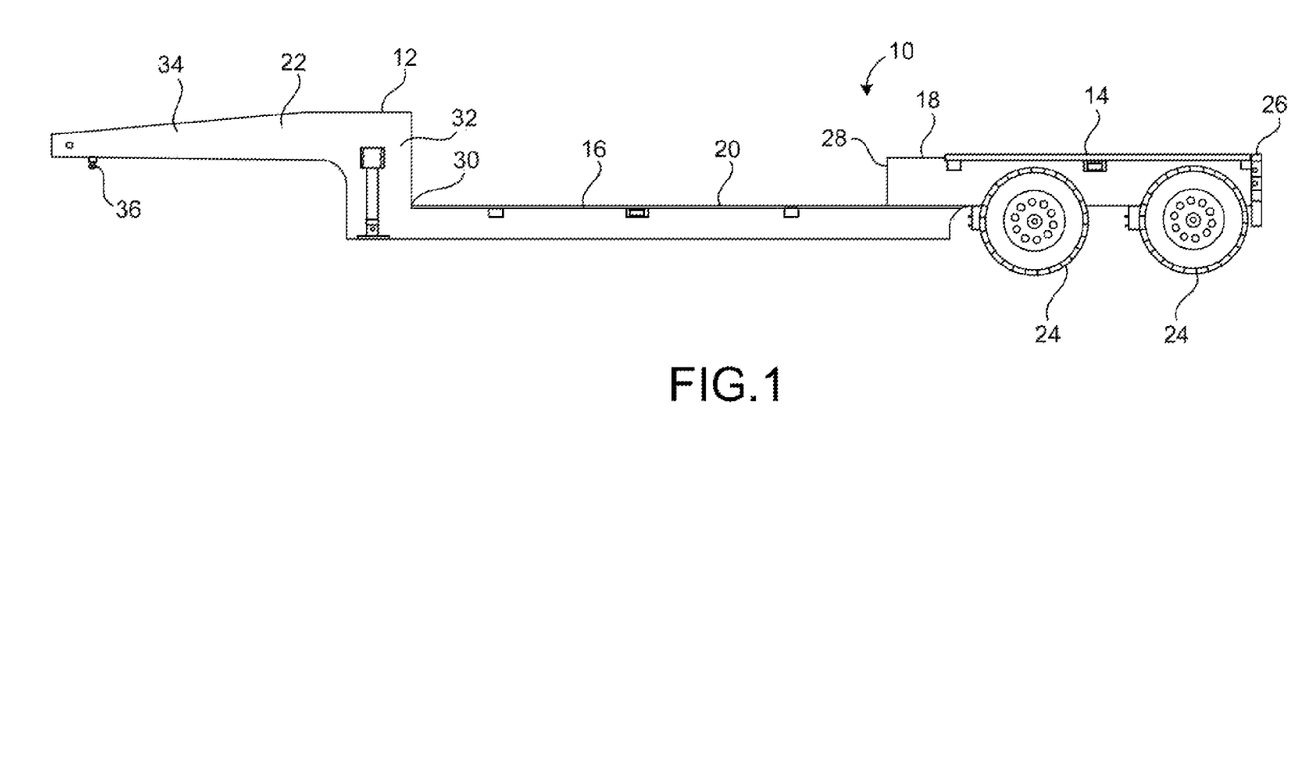
FIG. 1 is a side elevational view of a trailer assembly in accordance with the preferred embodiment of the present invention.

Referring to FIG. 1, there is shown the trailer assembly 10 in accordance with the preferred embodiment of the present invention. The trailer assembly 10 includes a frame 12 that has a first section 14 and a second section 16. The first section 14 is located at a higher level than the level of the second section 16. The first section 14 has a planar top surface 18. The second section 16 has a planar top surface 20. The planar top surface 18 of the first section 14 is in spaced parallel planar relationship to the planar top surface 20 of the second section 16. Each of the sections 14 and 16 will have a length of at least ten feet. The first section 14 is suitable for receiving a sand container thereon. The second section 16 is also suitable for receiving a sand container thereon. The frame 12 has a connector section 22 at the forward end thereof suitable for connection to a towing vehicle. A plurality of wheels 24 are rotatably mounted below the first section 14 so as to allow the frame 12 to move along an underlying surface.

The first section 14 is located directly above the wheels 24. A first section 14 has its planar surface 18 located about one foot nine inches above the planar top surface 20 of the second section 16. The first section 14 has an end 26 adjacent a rear of the trailer 12. The opposite end 28 is located adjacent to the second section 16.

The second section 16 has the planar top surface 20 extending from the end 28 of the first section 14 to an end 30 adjacent the connector section 22. The second section 16 is suitably welded, bolted, or otherwise connected to the underside of the first section 14 adjacent to the wheels 24. As such, this underslung configuration will minimize the height of the second section 16 so as to allow the heavy weights of a loaded proppant container to be placed thereon in an easy and convenient manner and also to minimize the center of gravity of the trailer 10 while traveling along a road surface.

The connector section 22 is a gooseneck connector having an end adjacent to the end 30 of the second section 16, a portion 32 extending upwardly therefrom, and a generally horizontal portion 34 extending to a coupling 36. Coupling 36 allows the trailer 10 to be suitably joined to a towing vehicle.

Figure 2:
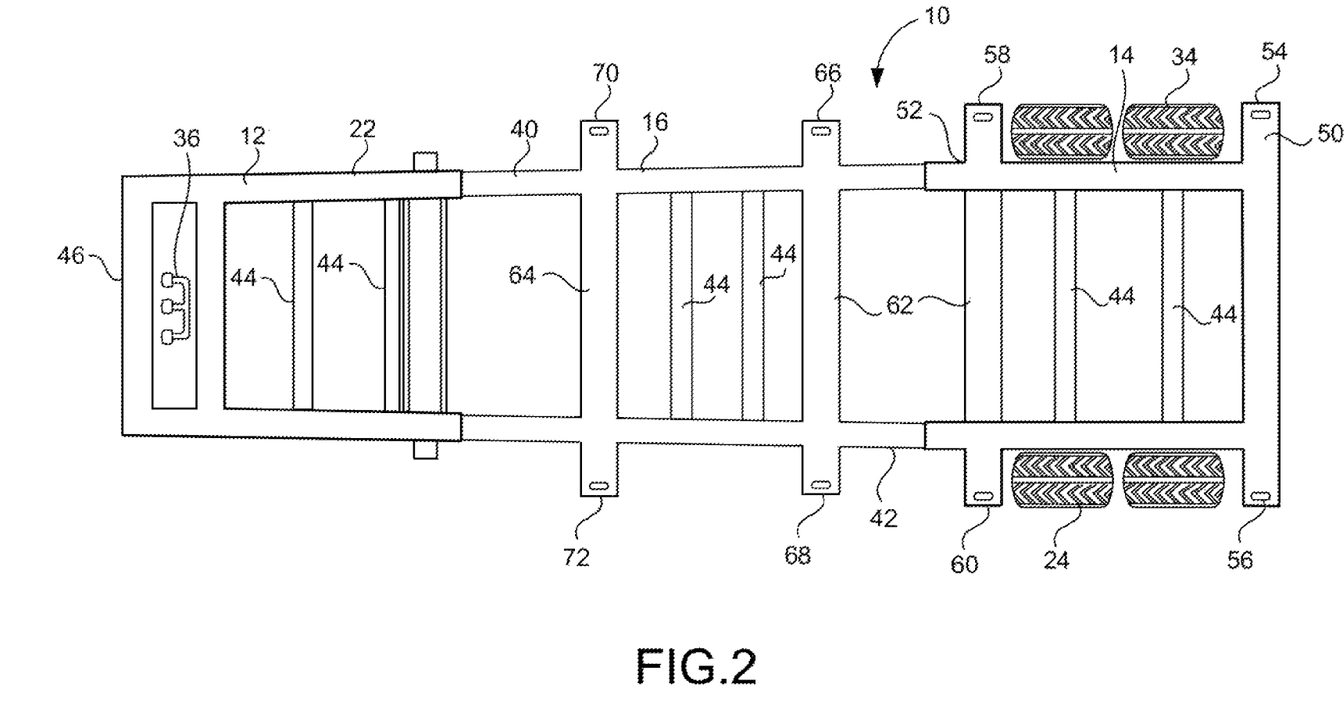
FIG. 2 is a plan view of a trailer assembly of the preferred embodiment of the present invention.

FIG. 2 illustrates the frame 10 a plane view. The frame 10 has a first side rail 40 and a second side rail 42 extending in parallel planar relationship to each other. A plurality of cross members 44 extend between the first side rail 40 and the second side rail 42. As such, cross members 44 enhance the structural integrity of the frame 12. These cross members 44, in combination with the side rails 40 and 42 also serve to minimize the weight of the trailer 10.

In FIG. 2, the first section 14 is illustrated as positioned above the wheels 24. In the present invention, the wheels 24 are arranged in tandem. Each of the tires associated with the wheels 24 can be of an expanded form so that the weight of each of the wheels 24 is minimized. In other words, the tires associated with each of the wheels 24 will have a width that is substantially greater than conventional trailer tires. It can be seen that a container placed upon the side rails 40 and 42 in the area of first section 14 will be located above the wheels 24 and between the wheels 24. As such, the wheels 24 will provide substantial support, in combination with the frame 12, for the transport of an empty container on the first section 14.

The second section 16 extends from the first section 14 to the connector section 22. Cross members 44 also extend between the side rails 40 and 42 in the second section 16. The use of the cross members 44, in combination with the side rails 40 and 42, further serve to minimize the weight of the trailer 10 for the transport of substantial quantities of proppant material. As such, the cross members 44, in combination with the side rails 40 and 42, maintain the structural integrity of the trailer 10 while, at the same time, reducing the weight of the trailer such that the loaded container can be transported within the weight limits imposed by governments on roads.

The connector section 22 also has cross members 44 extending between the side rails 40 and 42. The coupling 36 is illustrated adjacent to the forward end 46 of the frame 12.

Importantly, in FIG. 2, the first section 14 has a first outrigger 50 and a second outrigger 52. The first outrigger 50 extends across the first side rail 40 and the second side rail 42 so as to have one end 54 extending outwardly of the first side rail 40 and an opposite end 56 extending outwardly of the second side rail 42. Similarly, the second outrigger 52 extends across the side rails 40 and 42 so as to have an end 58 extending outwardly of the first side rail 40 and an end 60 extending outwardly of the second side rail 42. As such, the outriggers 50 and 52 are suitably configured so as to receive a ten foot ISO container thereon. Suitable connector mechanisms are provided on the outwardly extending portions of the outriggers 50 and 52 so as to secure, in a conventional fashion, with the connectors at the bottom of the container.

The second section 16 includes a first outrigger 62 and a second outrigger 64. The first outrigger 62 has an end 66 which extends outwardly of the first side rail 40 and another end 68 extending outwardly of the second side rail 42. The second outrigger 64 of the second section 16 has an end 70 which extends outwardly of the first side rail 40 and an end 72 which extends outwardly of the second side rail 42. As such, the outriggers 60 and 62 are suitably positioned so as to receive the second container thereon. The location of the loaded container placed upon the outriggers 62 and 64 will centralize the loaded container on the trailer 10 so as to enhance the transport capability of such a container. Suitable locking mechanisms can be provided on the outriggers 62 and 64 so as to secure the underside of the second container.

Figure 3:
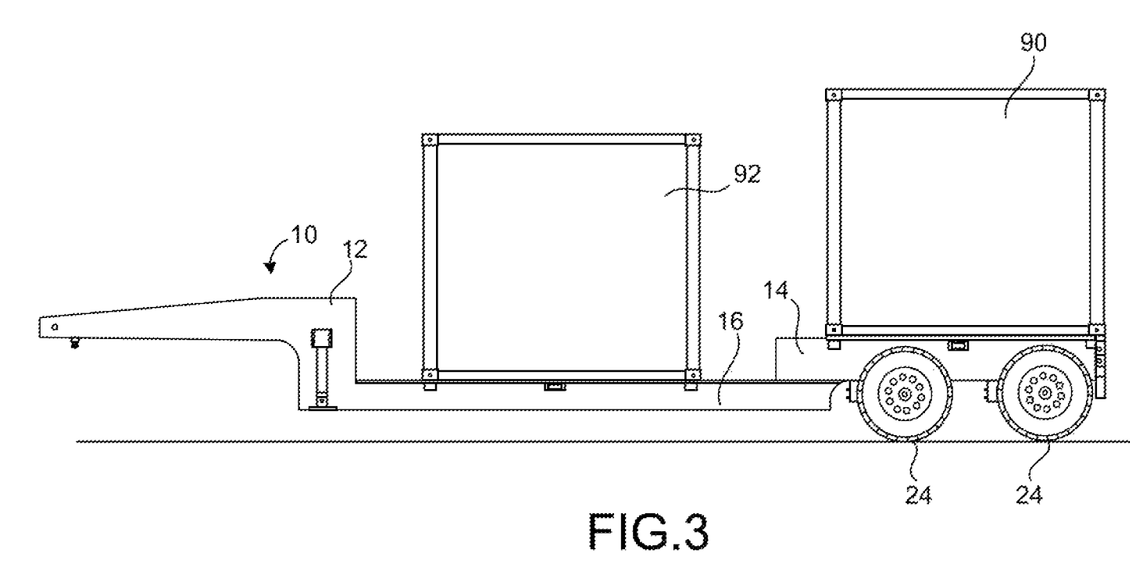
FIG. 3 is a side elevational view of the trailer assembly of the present invention as used in the transport of proppant containers.

FIG. 3 illustrates the manner in which a first container 90 is secured to the first section 14 of the frame 12 of the trailer 10 and the manner in which the second container 92 is secured to the second section 16 of the frame 12 of the trailer 10. In normal use, the first container 90 would be an empty container. This empty container is positioned on the first section 14 directly above the wheels 24 such that the empty container 90 can be transported from the well site. As illustrated in FIG. 3, the second container 92 is also an empty container. The empty container 92 is placed upon the outriggers 62 and 64 of the second section 16 so as to be transported from the well site. In this manner, the trailer 10 is suitable for transporting a plurality of empty containers from the well site.

Dimensional indications are provided on FIG. 3. As can be seen, the first container 90 will extend upwardly so as to have a height of thirteen feet three inches above the road surface. The container 90 has a height of nine feet six inches. As such, the total height of the first container 90 above the road will be three inches less than the height requirement of 13.5 feet Since the second container 92 is positioned at a lower level than that of the first container 90, the height of the second container 92 will have no effect during its transport along the road surface. Each of the containers 90 and 92 are suitably positioned on the trailer 10 in an optimal manner so as to enhance the handling capability of the truck during the transport of the containers 90 and 92 from the well site.

Importantly, in the present invention, when it is desired to transport proppant to the well site, only a single container can be used. The single container can be filled with 46,500 pounds of proppant. This 9.5 foot tall container will provide a proper angle of repose of the proppant within the container such that the proppant can be properly discharged from the container through an outlet at the bottom of the container.

In view of the great weight of the filled container, a single container can be used on the trailer 10 during transport to the well site. This single container would be in the nature of container 92. Container 92 is properly filled with proppant and placed upon the second section 16 of the frame 12. It can be seen that the weight of the proppant in the container 92 is properly centralized on the trailer 12 by being positioned on the lower second section 16. Additionally, the use of the lower second section 16 will create a lower center-of-gravity of the load on the trailer 10. As such, the handling characteristics of the trailer 10 are greatly improved and the possibilities of an overturn are avoided. The load in the container 92 is properly supported by the truck and by the wheels 24 so as to distribute the load of the container over a relatively wide and long area. As such, shifting of the load is effectively avoided. The unique structure of the trailer 10 creates a minimal weight trailer for this intended purpose so that the load can be safely and easily transported within the weight limits imposed upon roads.

In the configuration shown in FIG. 3, when a loaded container is transported, the first container 90 should not be placed on the first section 14. The placement of the container 90 on the first section 14 during the transport of the loaded container 92 could exceed the weight limits of the road.

Once the loaded container 92 reaches the well site, the container 92 can be released from the locking mechanisms associated with the outriggers 62 and 64 and the load can be lifted and delivered for proper discharge. Subsequently, empty containers, such as containers 90 and 92, can be put on the trailer 10 for transport back to the proppant supplying location.

The present application is a continuation which claims priority to and the benefit of U.S. application Ser. No. 13/854,405, filed on Apr. 1, 2013, and titled "Trailer Assembly for Transport of Containers of Proppant Material," which is incorporated herein by reference in its entirety.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

The invention claimed is:

1. A trailer for transporting fracking proppant containers, the trailer comprising:
   a skeletal frame structure with a front end and a rear end, the front end including a connector portion for attachment of the trailer to a towing vehicle, and the rear end having wheels attached thereto to allow the trailer to roll relative to a support surface, the frame comprising:
   one or more lower portions having a platform of latticed support members that form a support platform having selectively positioned cross members to provide structural support to the frame for an empty or a full fracking proppant container, at least one of the one or more lower portions having an elevation above the support surface less than that of the connector portion, the one or more lower portions having a plurality of outrigger members that span the width of the one or more lower portions and extend outwardly therefrom substantially flush with the support platform, the cross members being arranged between the plurality of outrigger members, the outrigger members having connector mechanisms for use in securing the fracking proppant container to the one or more lower portions, the wheels being mounted to the frame in a position between the outrigger members, and one or more open spaces underlying the fracking proppant containers when positioned on the trailer.

2. The trailer of claim 1, wherein at least one of the one or more lower portions at least partially overlaps at least a second portion of the trailer.

3. The trailer of claim 1, wherein the connector portion is integral to the one or more portions, and the one or more lower portions has an elevation of less than four feet above the support surface, so that when an empty fracking proppant container having a height of about 9.5 feet is placed on the first raised portion, the overall height of the fracking proppant container above the support surface does not exceed 13.5 feet, and the one or more open spaces being positioned to extend through the skeletal frame structure proximate the cross members.

4. The trailer of claim 1, wherein the length of each of the one or more portions is at least about 10 feet, so that each of the one or more portions can support a fracking proppant container having a 10 foot length, and the one or more portions include a plurality of substantially parallel outrigger members that span the width of the one or more portions and extend outwardly therefrom substantially flush with the support platform, the outrigger members having connector mechanisms to secure the fracking proppant container to the one or more lower portions.

5. The trailer of claim 1, wherein the empty fracking proppant container overlies the wheels, and respective ends of the respective plurality of outrigger members extend outwardly from the one or more lower portions such that the respective ends form the widest portion of the trailer, and the cross members being selectively arranged to reduce a weight of the trailer to enable larger quantities of fracking proppant to be positioned within the fracking proppant container when positioned on the trailer.

6. A trailer for transporting fracking proppant containers, the trailer comprising:
a skeletal frame structure with a front end and a rear end, the front end including a connector portion for attachment of the trailer to a towing vehicle, and the rear end having wheels attached thereto to allow the trailer to roll relative to a support surface, the frame comprising:
one or more lower portions having a platform of latticed support members that form a support platform having selectively positioned cross members to provide structural support to the frame for a full fracking proppant container when positioned thereon, at least one of the one or more lower portions having an elevation above the support surface less than that of the connector portion, the one or more lower portions having a plurality of outrigger members that span the width of the one or more lower portions and extend outwardly therefrom substantially flush with the support platform, the cross members being arranged between the plurality of outrigger members, the outrigger members having connector mechanisms to secure the fracking proppant container to the one or more lower portions, respective ends of the respective plurality of outrigger members extend outwardly from the one or more lower portions such that the respective ends form the widest portion of the trailer, and the cross members being positioned to reduce a weight of the trailer to enable larger quantities of fracking proppant to be positioned within the fracking proppant container positioned on the trailer.

7. The trailer of claim 6, wherein at least one of the one or more lower portions at least partially overlaps at least a second portion of the trailer.

8. The trailer of claim 6, wherein the connector portion is integral to the one or more portions, and the one or more lower portions has an elevation of less than four feet above the support surface, so that when an empty fracking proppant container having a height of about 9.5 feet is placed on the first raised portion, the overall height of the fracking proppant container above the support surface does not exceed 13.5 feet, and one or more open spaces extend through the skeletal frame structure proximate the cross members.

9. The trailer of claim 6, wherein the length of each of the one or more portions is at least about 10 feet, so that each of the one or more portions can support a fracking proppant container having a 10 foot length, and the one or more portions include a plurality of substantially parallel outrigger members that span the width of the one or more portions and extend outwardly therefrom substantially flush with the support platform, the outrigger members having connector mechanisms for use in securing the fracking proppant container to the one or more lower portions.

10. The trailer of claim 6, wherein the wheels are mounted to the frame in a position between the outrigger members, the center of gravity of the trailer is sufficiently low to reduce risk of the trailer overturning during movement, and one or more open spaces underlie the fracking proppant containers when positioned on the trailer.

* * * * *